US011511797B2

(12) United States Patent
Tosh et al.

(10) Patent No.: US 11,511,797 B2
(45) Date of Patent: Nov. 29, 2022

(54) DYNAMIC AND CONFIGURABLE CAPTURING OF DIAGNOSTIC DATA OF MOTOR CONTROL SYSTEMS

(71) Applicant: STEERING SOLUTIONS IP HOLDING CORPORATION, Saginaw, MI (US)

(72) Inventors: Owen Tosh, Saginaw, MI (US); David Sabol, Nashville, TN (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 425 days.

(21) Appl. No.: 16/734,954

(22) Filed: Jan. 6, 2020

(65) Prior Publication Data

US 2021/0206428 A1     Jul. 8, 2021

(51) Int. Cl.
*B62D 5/04*      (2006.01)
*G01M 17/06*    (2006.01)
*G05B 15/02*    (2006.01)

(52) U.S. Cl.
CPC ........... *B62D 5/0487* (2013.01); *G01M 17/06* (2013.01); *G05B 15/02* (2013.01)

(58) Field of Classification Search
CPC .. B62D 5/0487; B62D 5/0484; B62D 5/0481; G01M 17/06; G05B 15/02; G07C 5/0808; H02K 11/21; H02K 11/25; H02P 6/08
See application file for complete search history.

(56) References Cited

U.S. PATENT DOCUMENTS

2010/0023207 A1\*   1/2010   Maeda .................. G07C 5/085
                                                                701/33.4

FOREIGN PATENT DOCUMENTS

| CN | 105612089 A | \* | 5/2016 | ............. B60T 8/885 |
| DE | 102019201681 A1 | \* | 8/2020 | |
| JP | 2018055191 A | \* | 4/2018 | |
| WO | WO-2018028834 A1 | \* | 2/2018 | ............... G06N 5/02 |

\* cited by examiner

*Primary Examiner* — Mary Cheung
(74) *Attorney, Agent, or Firm* — Dickinson Wright PLLC

(57) ABSTRACT

A configurable diagnostic data monitor that captures diagnostic data of a motor control system is provided. Triggers, and records generated using the triggers, are configurable using, for example, different parameters or logical operators. Triggers buffer data that can be made part of a record when a trigger condition is met. Memory used by a trigger and memory usage for records is monitored and notifications generated indicating memory required for a trigger. Configuration of a trigger can involve customized priority relative to other triggers, adjustable data parameters, a persistence parameter, and configurable saved data capture for rate and duration.

25 Claims, 6 Drawing Sheets

DYNAMIC AND CONFIGURABLE CAPTURING OF DIAGNOSTIC DATA OF MOTOR CONTROL SYSTEMS

BACKGROUND

The present application generally relates to motor control systems, and particularly to a configurable diagnostic data monitor that captures diagnostic data of a motor control system.

In general, an electric power steering apparatus, which energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the assist torque (a steering assist torque), such a conventional electric power steering apparatus (EPS) performs a feedback control of a motor current. The feedback control adjusts a voltage supplied to the motor so that a difference between a current command value and a motor current becomes small or zero, and the adjustment of the voltage applied to the motor is generally performed by an adjustment of a duty ratio of a PWM (Pulse Width Modulation) control.

Diagnosing malfunctioning EPS parts can be difficult. For example, a significant percentage of warranty returns on EPS parts occurs without successful diagnosis of the issues that caused the malfunctioning.

SUMMARY

Described herein are example embodiments of a method to capture, in real time, diagnostic data of a system, and a computer program product having executable instructions to cause a processing unit to perform the method. The method involves determining the diagnostic data that is to be captured by receiving a trigger configuration having a trigger condition and a record configuration; identifying a computation based on a control signal of the system by parsing the trigger condition; computing a first value based on the computation that is identified; and comparing the first value with a second value identified from the trigger condition using a logical operator specified in the trigger condition. In response to the first value and the second value satisfying the trigger condition according to the logical operator that is specified, the method further involves capturing the diagnostic data in a record that is formatted according to the record configuration.

In accordance with an aspect of example embodiments, the record configuration indicates a duration for which to capture the diagnostic data, and/or a data capture rate at which to capture the diagnostic data, and/or In accordance with an aspect of example embodiments, the diagnostic data that is captured includes one or more control signal values of the system.

In accordance with aspects of example embodiments, the record is a first record captured at a first timestamp, and the monitoring system is further configured to adjust the trigger condition dynamically and in response capture a second record captured at a second timestamp, the first record being distinct from the second record.

In accordance with aspects of example embodiments, the method further involves determining a validity of the trigger configuration during a setup of the trigger configuration by an operator; and indicating the validity of the trigger configuration for the operator to adjust the trigger configuration accordingly.

In accordance with aspects of example embodiments, a steering system is provided that has a motor; a controller; and a monitoring system. The monitoring system has a memory device and a processor, and is coupled with the controller of the steering system. The monitoring system is configured to capture, in real time, diagnostic data of the steering system, wherein determining the diagnostic data that is to be captured involves the method; that is, receiving a trigger configuration that has a trigger condition and a record configuration; identifying a computation based on a control signal of the steering system by parsing the trigger condition; computing a first value based on the computation that is identified; and comparing the first value with a second value identified from the trigger condition using a logical operator specified in the trigger condition. In response to the first value and the second value satisfying the trigger condition according to the logical operator that is specified, the diagnostic data is captured in a record that is formatted according to the record configuration.

These and other advantages and features will become more apparent from the following description taken in conjunction with the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the technical solutions described herein are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Aspects of the illustrative embodiments of the technical solutions described herein are particularly pointed out and distinctly claimed in the claims at the conclusion of the specification. The foregoing and other features, and advantages of the technical solutions described herein are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to any type of system for which it is desired to capture diagnostic data. As an example, the illustrated embodiments are described with respect to a steering system. It is to be understood that the present application can be used with other types of systems as explained below. The example steering system helps the operator to steer a vehicle by providing necessary torque assist. Today, a modern steering system typically includes components such as steering wheel, column, rack-pinion gear, electric motor actuator etc. The assist torque is based on operator's applied torque. In a steady-state sense, the operator torque and assist torque counter the rack force generated because of tire-road interaction.

Figure 1:
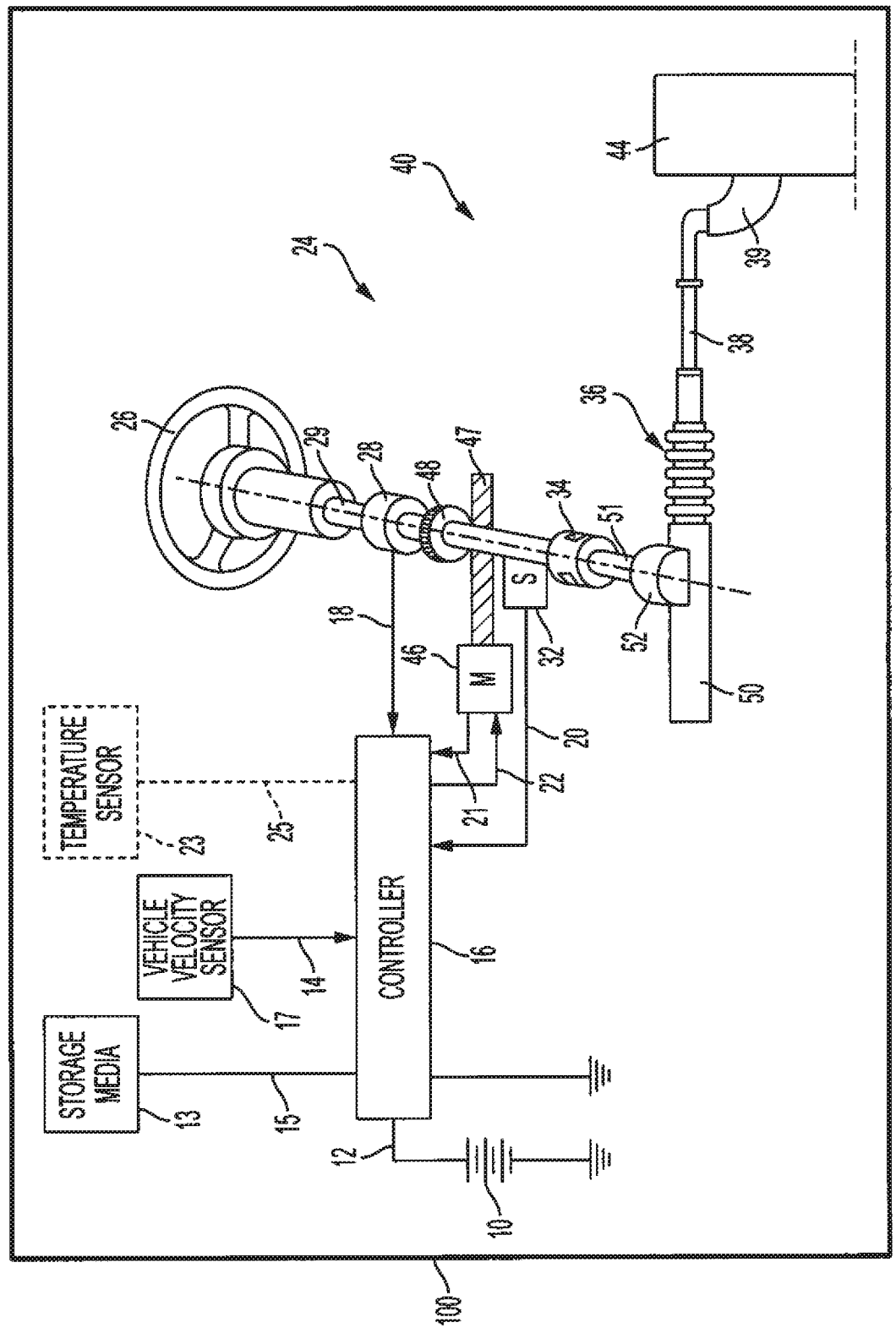
FIG. 1 depicts an EPS system according to one or more embodiments.

Referring now to the Figures, where the technical solutions will be described with reference to specific embodiments, without limiting same, FIG. 1 is an exemplary embodiment of an electric power steering system (EPS) 40 suitable for implementation of the disclosed embodiments. The steering mechanism 36 is a rack-and-pinion type system and includes a toothed rack (not shown) within housing 50 and a pinion gear (also not shown) located under gear housing 52. It should be noted that although a rack-and-pinion type system is depicted as an example herein, the technical solutions described herein is applicable to any type of EPS such as rack based, column based, pinion based etc. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) or tire(s) 44 (only one shown).

Electric power steering assist is provided through the control apparatus generally designated by reference numeral 24 and includes the controller 16 and an electric machine 46, which could be a permanent magnet synchronous motor (PMSM), or a permanent magnet direct current motor (PMDC), or any other type of motor, and is hereinafter denoted as motor 46. The controller 16 is powered by the vehicle power supply 10 through line 12. The controller 16 receives a vehicle speed signal 14 representative of the vehicle velocity from a vehicle velocity sensor 17. Steering angle is measured through position sensor 32, which may be an optical encoding type sensor, variable resistance type sensor, or any other suitable type of position sensor, and supplies to the controller 16 a position signal 20. Motor velocity may be measured with a tachometer, or any other device, and transmitted to controller 16 as a motor velocity signal 21. A motor velocity denoted $\omega_m$ may be measured, calculated or a combination thereof. For example, the motor velocity $\omega_m$ may be calculated as the change of the motor position θ as measured by a position sensor 32 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. Alternatively, motor velocity may be derived from motor position as the time rate of change of position. It will be appreciated that there are numerous well-known methodologies for performing the function of a derivative.

As the hand wheel 26 is turned, torque sensor 28 senses the torque applied to the hand wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is one type of torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing an electric motor, e.g., steering, valve control, and the like. Moreover, the references and descriptions herein may apply to many forms of parameter sensors, including, but not limited to torque, position, speed and the like. It should also be noted that reference herein to electric machines including, but not limited to, motors, hereafter, for brevity, and simplicity, reference will be made to motors only without limitation.

In the control system 24 as depicted, the controller 16 utilizes the torque, position, and speed, and like, to compute a command(s) to deliver the required output power. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the corresponding voltage(s) out of inverter (not shown), which may optionally be incorporated with controller 16 and will be referred to herein as controller 16, such that, when applied to the motor 46, the desired torque or position is generated. In one or more examples, the controller 24 operates in a feedback control mode, as a current regulator, to generate the command 22. Alternatively, in one or more examples, the controller 24 operates in a feedforward control mode to generate the command 22. Because these voltages are related to the position and speed of the motor 46 and the desired torque, the position and/or speed of the rotor and the torque applied by an operator are determined. A position encoder is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Desired torque may be determined by one or more torque sensors 28 transmitting torque signals 18 indicative of an applied torque. One or more exemplary embodiments include such a torque sensor 28 and the torque signal(s) 18 therefrom, as may be responsive to a compliant torsion bar, T-bar, spring, or similar apparatus (not shown) configured to provide a response indicative of the torque applied.

In one or more examples, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The position signal 20, velocity signal 21, and a torque signal(s) 18 among others, are applied to the controller 16. The controller 16 processes all input signals to generate values corresponding to each of the signals resulting in a rotor position value, a motor speed value, and a torque value being available for the processing in the algorithms as prescribed herein. Measurement signals, such as the above mentioned are also commonly linearized, compensated, and filtered as desired to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the identification of motor parameters, control algorithm(s), and the like), controller 16 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

Accordingly, the EPS 40 includes numerous components, and each of these components further include numerous electrical and/or mechanical subsystems. In case of an error or failure reported with EPS 40, diagnosing which particular component(s) caused the failure is a difficult challenge. In various practical scenarios, component(s) are returned by operators or other personnel without specific problems being diagnosed. This leaves a significant amount of work to identify the root cause of the damage to the returned component. In addition, even when the cause is known, it can be difficult to classify damage as supplier-, manufacturer-, or user-related misuse or damage. While diagnostic codes are usually available, the information they contain may be insufficient for diagnosing such issues.

It should be noted that such technical challenges can be in any type of an EPS, such as a steer by wire steering system, a column-based EPS, a rack-based EPS, a hydraulic-based EPS, etc. The technical solutions described herein are applicable to any type of a steering system or other motor control application. Accordingly, by way of an example of a motor control system for which diagnostic data is desired, the description further refers to a "steering system 40", which can be any type of a steering system, such as an EPS, a steer by wire system, and the like.

The technical solutions described herein address the technical challenges herein by providing a configurable diagnostic data monitor ("diagnostic data monitor" henceforth). The diagnostic data monitor, in one or more examples, accepts a list of inputs, as well as a configuration table, and records input data for the provided list according to the corresponding configuration from the table.

Figure 2:
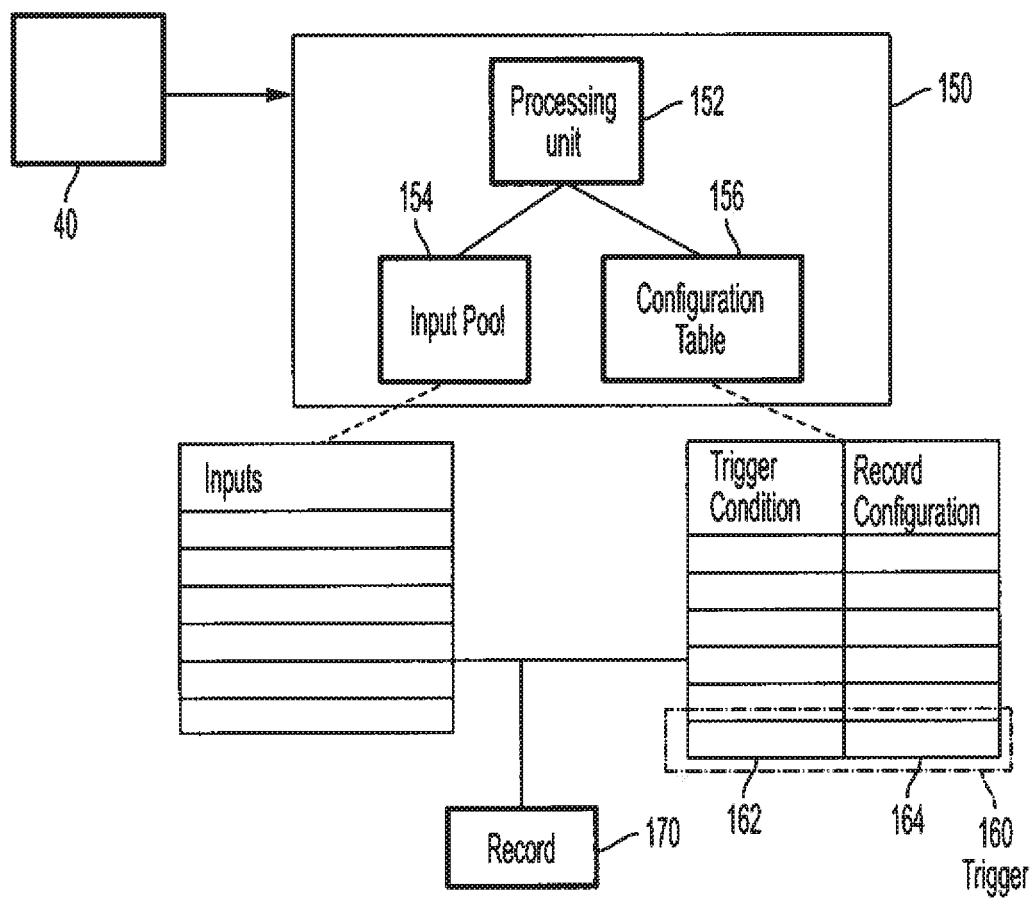
FIG. 2 depicts a block diagram of a diagnostic data monitor according to one or more illustrative embodiments.

FIG. 2 depicts a block diagram of a diagnostic data monitor according to one or more embodiments. The diagnostic data monitor 150 is coupled with the steering system 40. The diagnostic data monitor 150 includes a processor 152, an input pool 154, a configuration table 156, and one or more records 170, among other components.

The input pool 154 is a list of inputs, which can be provided as an indexed list. The configuration table 156 is a list of triggers 160 corresponding to the inputs from the input pool 154. Each trigger 160 contains a condition 162, and a record configuration 164. When the trigger condition 162 is met, a record 170 is created based on the corresponding record configuration 164.

The inputs in the input pool are one or more control signals from the steering system 40 that are used to compute/detect a record 170 according to the trigger 160. The trigger condition 162 uses signals from the input pool 154 in conjunction with a predefined list of mathematical and logical operators to evaluate a logical statement. The exact logic of the operators may be dependent on the inputs used. The list of operators and the format of the input pool 152 is predetermined for the diagnostic data monitor 150. For example, the input pool 152 may contain information on the data type of each input, or it could convert everything to a uniform data type.

The record configuration 164 contains information on what data to store, and when, in case the trigger condition 162 is met. The record configuration 164 also defines Data is stored both before and after the trigger condition 162 is met, at a configurable rate. The record configuration 164 also defines on which trigger occurrence to store data (e.g. first, most recent). The data is stored in the record 170.

Accordingly, the record 170 is the resulting data from a trigger occurrence. The record 170 contains information to identify the responsible trigger. Further, the record 170 contains all configured data in the record configuration 164. In one or more examples, the record 170 may contain other (non-configurable) data (e.g. a timestamp). Further, the record 170 is accessible to a test tool, and/or another processor (other than 152). In one or more examples, the record 170 is stored temporarily, (e.g. in volatile memory), or permanently (in non-volatile memory).

Figure 3:
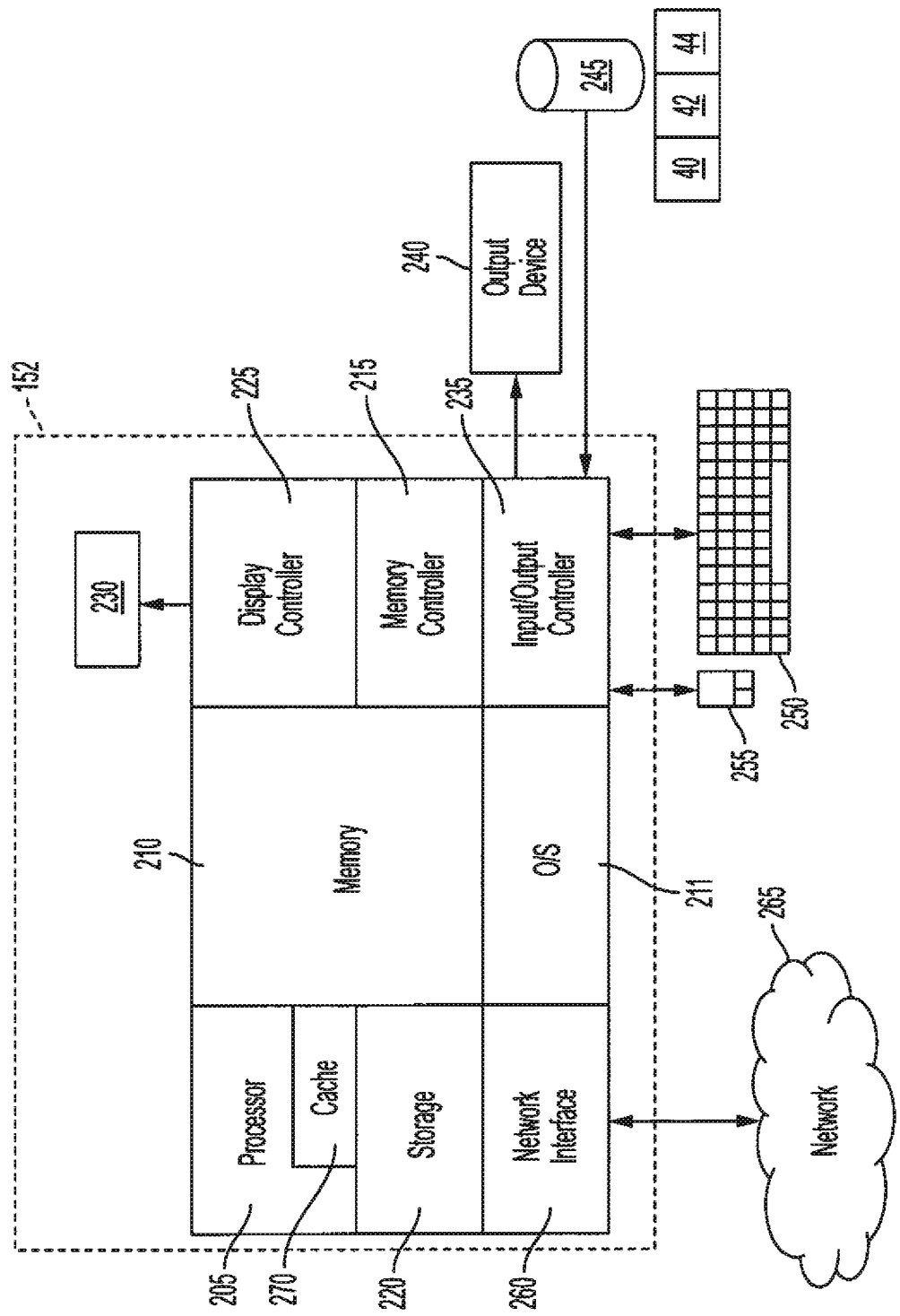
FIG. 3 illustrates an example processing unit according to one or more illustrative embodiments.

FIG. 3 illustrates an example processing unit according to one or more embodiments. The processing unit 152 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The processing unit 152 may further include a display controller 225 coupled to a user interface or display 230. In some embodiments, the display 230 may be an LCD screen. In other embodiments, the display 230 may include a plurality of LED status lights. In some embodiments, the processing unit 152 may further include a network interface 260 for coupling to a network 265. The network 265 may be an IP-based network for communication between the processing unit 152 and an external server, client and the like via a broadband connection. In an embodiment, the network 265 may be a satellite network. The network 265 transmits and receives data between the processing unit 152 and external systems. In an embodiment, the external system may be another aerial drone or a drone docking system, wherein the transmitting and receiving of data allows the processing unit 152 to identify the other drone or docking system and determine when the payload is to be transferred to the other drone. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a controller area network (CAN), a virtual private network (VPN), intranet or other suitable network system and may include equipment for receiving and transmitting signals.

The processing unit 152 facilitates the operations of the diagnostic data monitor 150 including configuring the triggers 160 and further generating and storing the record 170 according to the trigger 160 based on monitoring the signals from the input pool 152.

Figure 4:
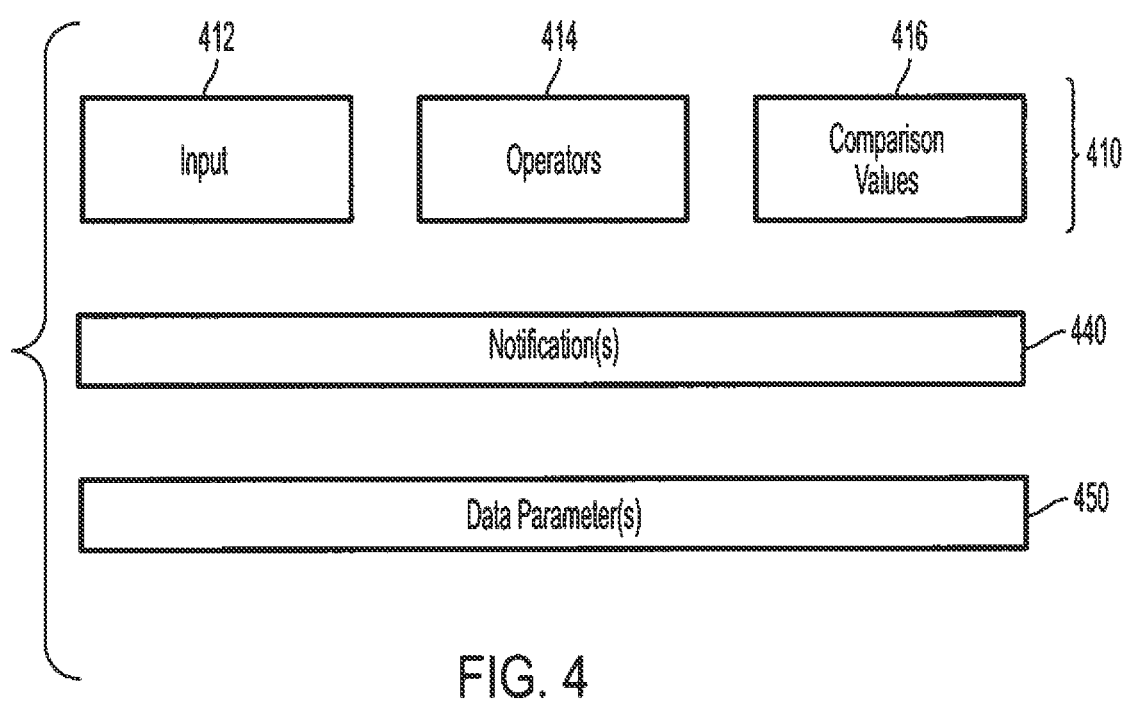
FIG. 4 depicts a block diagram for configuring a diagnostic data monitor according to one or more illustrative embodiments.

FIG. 4 depicts a block diagram for configuring a diagnostic data monitor according to one or more embodiments. Configuring the diagnostic data monitor 150 can include configuring the trigger 160 as well as the record 170 that is to be generated using the trigger 160. Configuring either includes configuring event configuration parameters 410 and data parameters 450. The event configuration parameters 410 include input parameters 412, operators 414, and comparison-values 416. The configuring further includes generating one or more notifications 440 to indicate validity/invalidity, system status, and other such information to an operator that is configuring the diagnostic data monitor 152.

The trigger 160 is configurable within predetermined limits. For example, amount of non-volatile memory and amount of volatile memory can limit a number of triggers and/or a number of records that can be stored and used. The trigger 160 buffers data continuously so that the data can be made part of the record 170 if the trigger condition 162 is met. Accordingly, monitoring amount of memory being used by the trigger 160 and that will be required by the record 170 that can get generated has to be monitored. Further, the operator has to be informed if the trigger 160 and the record 170, as configured by the operator, are not feasible because of the memory limits. Therefore, the notifications 440 includes a notification that dynamically updates according to the ongoing configuration, the notification indicating the amount of memory required for the trigger 160 as well as for the corresponding record 170.

The configuration includes adjusting one or more data parameters 450. For example, each trigger 160 can have a persistence parameter. The persistence parameter can be first event of life of vehicle, where the data that is captured since the first use of the component is stored (and not be overwritten by other data). Alternatively, or in addition, the persistence parameter can be configured to first event of ignition cycle so that the record 170 that is captured since the start of the vehicle 100 is not overwritten. Alternatively, or in addition, the persistence parameter is configured to store only the data associated with the most recent event corresponding to the trigger 160.

The data parameters 450 can further include a number of recent NTCs (e.g. within a predetermined range), a data capture rate (e.g. bytes/millisecond), and a data capture duration (e.g. in milliseconds), and other such parameters affecting amount of data being captured. In addition the data parameters 450 can include a capture option for each input signal being captured from the input pool. For example, the capture option can be one from a predetermined list of options including none, once (collect single value at time of trigger), repeated (capture at specified capture rate, or at capture duration).

Further, configuring input parameters 412, operators 414, and comparison values 416 can include providing a trigger structure to the operator. For example, the trigger structure can be expressed as:

SignalA [mathOp SignalB] [unaryOp] compOp SignalX

Here, SignalA is a "base signal" that is to be monitored. For example, the base signal can include NTC/CTC status, CAN status, or any system signal. The compOp is a comparison operator (e.g. >, <, =). SignalX is a signal or constant against which the base signal is compared using the compOp.

Further, mathOp and SignalB facilitate performing optional mathematic operation(s) to apply before the comparison is performed. In one or more examples, mathOp is a mathematical operator (eg. +, −, ×, ÷, bitwise math etc.). In one or more examples, signalB is any system signal or constant. Further, in one or more examples, unaryOp is an optional unary mathematic operation to apply before the comparison is performed; for example, absolute value, reciprocal, negate, etc.

Another example of the trigger structure can be:

unaryOpA(SignalA1 mathOpA SignalA2) compOpA SignalA3)
   joinOp
   (unaryOpB(SignalB1 mathOpB SignalB2) compOpB SignalB3)

| | | |
|---|---|---|
| unaryOpA | Optional | Unary math operation to be performed before the comparison. May be one of: Absolute value Reciprocal Negation |
| SignalA1 | Required | Base signal to be used for the comparison. May be one of: An input from the input pool A DTC status byte |
| mathOpA | Optional | Binary math operation to be performed before the comparison. May be one of: Addition Subtraction Multiplication Division Bitwise AND Bitwise OR Bitwise XOR |
| SignalA2 | Optional* | Secondary signal to be used with the binary math operation. May be one of: An input from the input pool A constant value *Required if mathOp is defined. |
| compOpA | Required | Comparison operator to be used between primary/secondary signals and comparison signal |
| | | (SignalA3). May be one of: Equal Not equal Greater than Greater than or equal Less than Less than or equal |
| SignalA3 | Required | Final signal to be used for the comparison. May be one of: An input from the input pool A constant value |
| joinOp | Optional | Can be used to create a second condition. May be one of: And (trigger if both conditions are met) Or (trigger if either condition is met) |
| unaryOpB | Optional* | Same as unaryOpA. *Ignored if joinOp is not defined. |
| SignalB1 | Optional* | Same as SignalA1. *Required if joinOp is defined. |
| mathOpB | Optional* | Same as mathOpA. *Ignored if joinOp is not defined. |
| SignalB2 | Optional* | Same as SignalA2. *Required if joinOp and mathOpB are defined. |
| compOpB | Optional* | Same as compOpA. *Required if joinOp is defined. |
| SignalB3 | Optional* | Same as SignalA3. *Required if joinOp is defined. |

In this case, the components that are marked optional are those that are used when a join operation is performed for using multiple trigger conditions. It should be noted that additional join operations can be performed in other examples.

Figure 5:
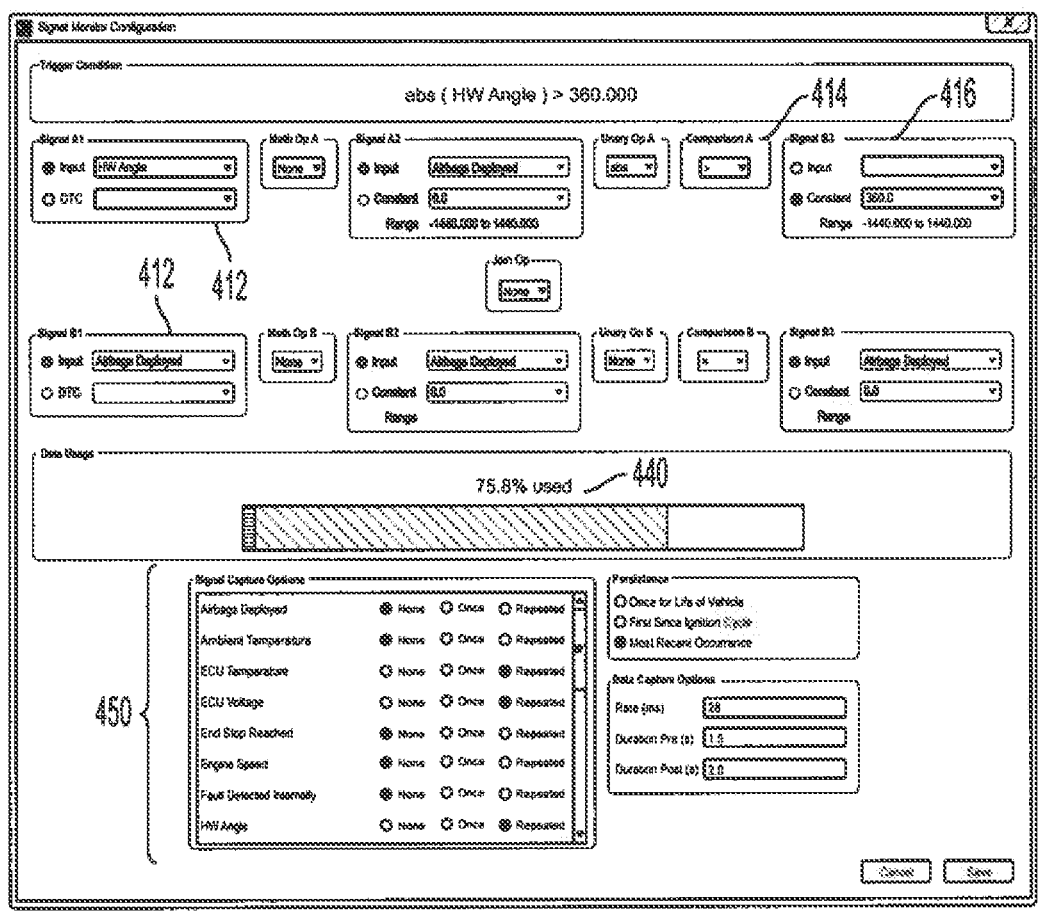
FIG. 5 depicts a screenshot for configuring an example trigger according to one or more illustrative embodiments.

FIG. 5 depicts a screenshot for configuring an example trigger according to one or more embodiments. In the illustrated example, event condition is configured using a unary operator (abs) with handwheel angle as base signal, the trigger condition being when the handwheel angle is greater than (compOp) 360° (signalB). The data parameters 450 are also configured to capture particular input signals at specific capture rates and the persistence parameter is also selected. It should be noted that additional signals can be used for setting up the trigger configuration (e.g. signalB1), which are not used in this case.

The data usage resulting from this trigger 160 is depicted in the notifications 440. In one or more examples, the current data usage is also shown in addition to the data use caused by the presently configured trigger.

The record 170 contains at least the following information:

| | | |
|---|---|---|
| RecVersion | 1 byte | Record version (set to 1). For future compatibility. |
| TriggerId | 1 byte | Trigger configuration identifier. |
| Counter | 2 bytes | Number of times the trigger has occurred. Saturates at the maximum value of 65535. |
| Timestamp | 4 bytes | Internal reference timestamp at time of trigger, in milliseconds. Relative to ignition-on time. |
| IgnCounter | 2 bytes | Ignition counter at time of trigger. |
| NumDtc | 1 byte | Number of DTC status bytes saved. |
| DtcData | 1 byte × NumDtc | Status bytes of DTCs at time of trigger. |
| NumFixed | 1 byte | Number of CaptureOption set to Once. |

-continued

| | | |
|---|---|---|
| Fixed Inputs | 1 byte × NumFixed | Indices of inputs from the input pool. |
| FixedData | 2 bytes × NumFixed | Array of capture data at time of trigger, using FixedInputs as the index. |
| NumDynInputs | 1 byte | Number of CaptureOption set to Repeated. |
| DynInputs | 1 byte × NumDynInputs | Indices of inputs from the input pool. |
| DynRate | 2 bytes* | Rate of captured data, in milliseconds. *Only recorded if NumDynInputs is greater than zero. |
| DynPointsBefore | 2 bytes* | Number of repeated data points captured before the trigger occurred. *Only recorded if NumDynInputs is greater than zero. |
| DynPointsAfter | 2 bytes* | Number of repeated data points captured after the trigger occurred. *Only recorded if NumDynInputs is greater than zero. |
| DynOffsetTime | 2 bytes* | Offset of actual trigger from trigger data point, in milliseconds. Must be less than DynRate. *Only recorded if NumDynInputs is greater than zero. |
| DynData | 2 bytes × NumDynInputs × (DynPointsBefore + DynPointsAfter) | Two dimensional array of capture data. The data is stored by input pool index, ascending, then by dynamic capture time. |

The components marked optional in the above are based on other options that are selected by the operator. For example, the FixedData component is selected in the case the data is to be captured only once when the trigger condition 162 is met, and the DynData component is selected in the case the data is to be captured repeatedly once the trigger condition 162 is met. It is understood that the component names and special conditions/values specified in the above scheme are merely exemplary, and that in other embodiments different component names and special values can be used.

The Flight recorder 150, in one or more examples, saves data to non-volatile memory when the trigger condition 162 is met. The diagnostic data monitor 150, in one or more examples, allows for multiple triggers 160 to be configured for capturing a record 170.

The trigger conditions 162 are configurable by an operator. In the event of limited resources, the triggers 160 are prioritized (customizable post-build), with the priorities being customizable. Each trigger has separately configurable data that is saved. Each trigger 160 has separately configurable persistence parameter that defines whether to capture the first event, the most recent event, etc. The saved data capture is configurable for rate and duration, and these parameters can be separately configured for each trigger. According to one or more embodiments, technical solutions described herein are advantageous for implementing an embedded system that is optimized for size and cost relative to more expensive and complex data capture systems. For example, the technical solutions described herein can be implemented via a controller or computing system having a dedicated function within a larger mechanical or electrical system and therefore configured to perform this dedicated function with limited resources (e.g., processing speed, power and memory resources) as compared with more expensive and complex general-purpose systems.

Figure 6:
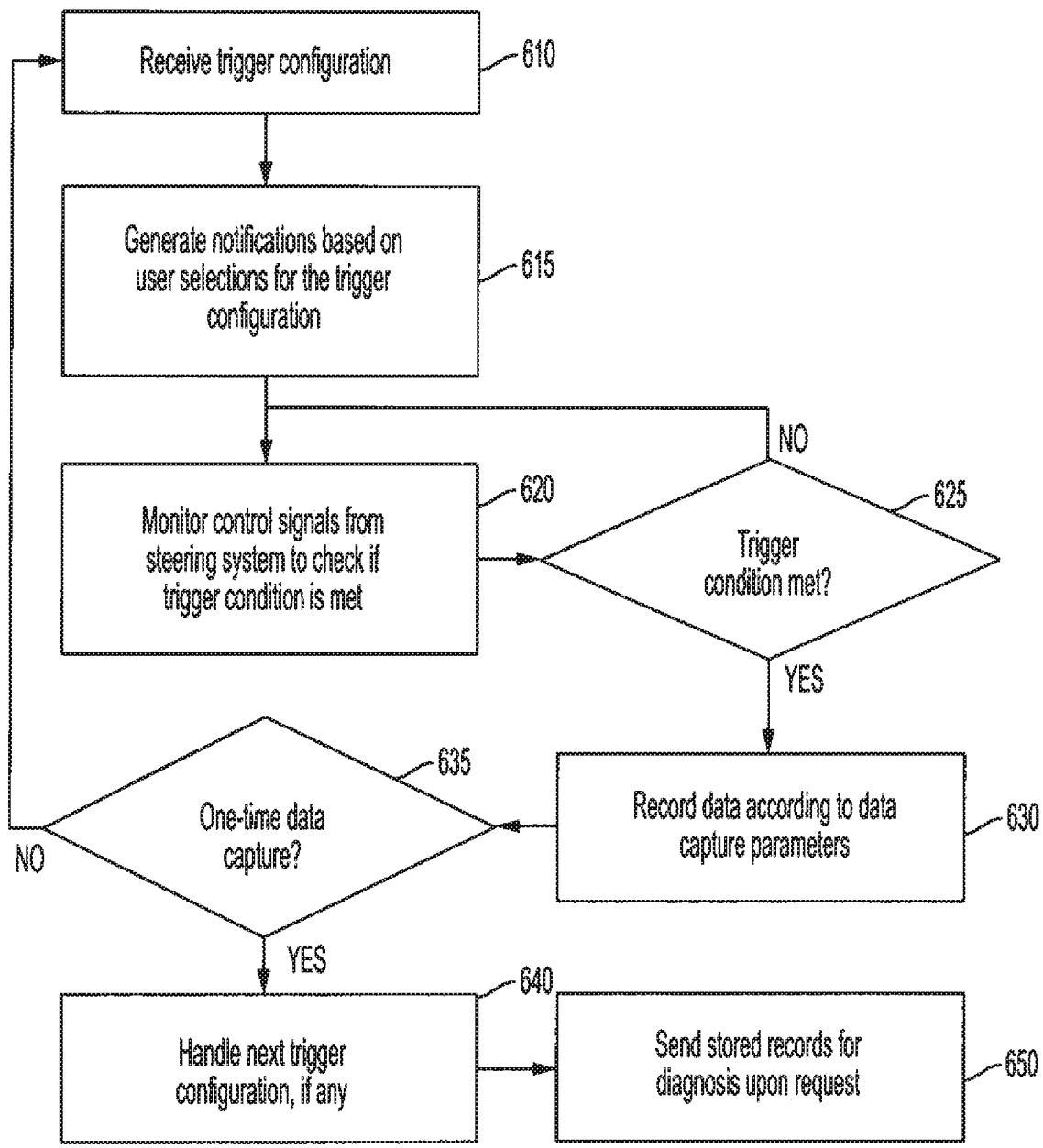
FIG. 6 depicts a flowchart of a method for configuring and recording diagnostic data using a configurable diagnostic data monitor according to one or more illustrative embodiments.

FIG. 6 depicts a flowchart of a method for configuring and recording diagnostic data using a configurable diagnostic data monitor according to one or more embodiments. The method includes receiving trigger configuration of the diagnostic data to be captured according to an operator, at 610. The configuration includes one or more triggers 160 setup by the operator via a user interface. The configuration received can include a particular storage scheme for specifying the trigger configuration for capturing the diagnostic data by the operator. In one or more examples, the storage scheme for the trigger configuration is defined as follows.

| | |
|---|---|
| Enabled | Whether the trigger is used. |
| SignalA1Idx | Index of input signal. Special values: 0xFF - Signal A1 is a DTC |
| SignalA1DtcIdx | DTC index for SignalA1. *Only used if SignalA1Idx is 0xFF. |
| MathOpAIdx | Index of math operator. Enumerated value: 0x00 - No math operation 0x01 - Addition 0x02 - Subtraction 0x03 - Multiplication 0x04 - Division 0x05 - Bitwise AND 0x06 - Bitwise OR 0x07 - Bitwise XOR |
| SignalA2Idx | Index of input signal. Special values: 0xFF - SignalA2 is a constant *Only used if MathOpAIdx is not 0x00. |

-continued

| | |
|---|---|
| SignalA2Const | Constant value for SignalA2. Fixed point type is the same as SignalA1.<br>*Only used if SignalA2Idx is 0xFF and MathOpAIdx is not 0x00. |
| UnaryOpAIdx | Unary operator index. Enumerated value:<br>0x00 - No unary operation<br>0x01 - Absolute value<br>0x02 - Reciprocal<br>0x03 - Negation |
| CompOpAIdx | Comparison operator index. Enumerated value:<br>0x00 - Equal<br>0x01 - Not equal<br>0x02 - Greater than<br>0x03 - Greater than or equal<br>0x04 - Less than<br>0x05 - Less than or equal |
| SignalA3Idx | Index of input signal. Special values:<br>0xFF - SignalA3 is a constant |
| SignalA3Const | Constant value for SignalA3. Fixed point type is the same as SignalA1.<br>*Only used if SignalA3Idx is 0xFF. |
| JoinOpIdx | Index of join operation. Enumerated value:<br>0x00 - None<br>0x01 - AND<br>0x02 - OR |
| SignalB1Idx | Index of input signal. Special values:<br>0xFF - SignalB1 is a DTC<br>*Only used if JoinOpIdx is not 0x00. |
| SignalB1DtcIdx | DTC index for SignalB1.<br>*Only used if JoinOpIdx is not 0x00 and SignalB1Idx is 0xFF. |
| MathOpBIdx | Index of math operator. Enumerated value (same as MathOpAIdx).<br>*Only used if JoinOpIdx is not 0x00. |
| SignalB2Idx | Index of input signal. Special values:<br>0xFF - SignalB2 is a constant<br>*Only used if JoinOpIdx is not 0x00 and MathOpBIdx is not 0x00. |
| SignalB2Const | Constant value for SignalB2. Fixed point type is the same as SignalB1.<br>*Only used if JoinOpIdx is not 0x00 and SignalB2Idx is 0xFF and MathOpAIdx is not 0x00. |
| UnaryOpBIdx | Unary operator index. Enumerated value (same as UnaryOpAIdx).<br>*Only used if JoinOpIdx is not 0x00. |
| CompOpBIdx | Comparison operator index. Enumerated value (same as CompOpAIdx).<br>*Only used if JoinOpIdx is not 0x00. |
| SignalB3Idx | Index of input signal. Special values:<br>0xFF - SignalB3 is a constant<br>*Only used if JoinOpIdx is not 0x00. |
| SignalB3Const | Constant value for SignaB3. Fixed point type is the same as SignalB1.<br>*Only used if JoinOpIdx is not 0x00 and SignalB3Idx is 0xFF. |
| Persistence | Enumerated value:<br>0x00 - First occurrence in life of vehicle<br>0x01 - First occurrence during ignition cycle<br>0x02 - Most recent occurrence |
| Rate | Data capture rate in milliseconds. |
| NumPointsBefore | Number of data points to capture before the trigger occurs. Computed from Duration settings. |
| NumPointsAfter | Number of data points to capture after the trigger occurs. Computed from Duration settings. |
| CaptureOption | Array of data capture settings for each of the inputs in the input pool. Enumerated value:<br>0x00 - None<br>0x01 - Once<br>0x02 - Repeated |

It is understood that the above storage scheme is one possible scheme, and that in other embodiments, different storage scheme can be used. Further, the particular data sizes and representative values used for one or more options provided by the components of the storage scheme are merely examples, and different values can be used in other embodiments. when the operator is configuring the trigger, the diagnostic data monitor 150 provides a user interface (e.g. see FIG. 5) to allow such configuration. In this, the selections for the trigger condition 162 and data parameters 450 are received as part of the trigger configuration via the user interface. The notifications 440 are updated according to the selections being made by the operator, at 615.

Generating the notifications 440 can include indicating the amount of memory space required for the trigger condition 162 being setup. A potential record size is computed and compared with available memory space. The available memory space, the required memory space for the potential record are shown to the operator as part of the notifications 440 in one or more examples. Alternatively, or in addition, notifications based on these calculations can also be shown, such as a pie diagram showing portions marked according to the computations. For example, in the above case, the record size can be calculated in bytes as: 21+NumDtc+(3×NumFixed)+(NumDynInputs×(1+(2×NumDynPoints))). Available memory size may be a predefined value, or can be detected at runtime in one or more examples.

As described herein, the configuration of the light recorder is based on one or more limitations/factors associated with the steering system 40 or with the hardware limitations that the diagnostic data monitor 150 faces. For example, the available non-volatile memory storage space can impose a limit on the number and size of records 170, Further, the available volatile memory storage space imposes a limit on the number of configurable triggers 160. Further, in one or more examples, dynamic memory allocation may not be available in the target platform, which requires a balance between storage efficiency and implementation complexity. Further yet, for compliance with one or more automotive standards, the inputs (in the input pool 154) are not configurable by the operator, therefore, a fixed list of input signals is predefined from which the operator can select one or more input signals for use.

The method further includes monitoring the control signals of the steering system 40 according to the trigger configuration, at 620. The monitoring is performed based on parsing the trigger 160 from the trigger configuration. As part of the monitoring, the input signals from the input pool 152 are monitored for checking if the trigger condition 162 from the trigger 160 is met. The check includes performing the computations as per the trigger condition 162 in the trigger 160 using the one or more input signals specified in the trigger condition 162.

If the trigger condition is not satisfied, the diagnostic data monitor continues monitoring the input signals, at 625. If the trigger condition is satisfied, the diagnostic data monitor 150 generates the record 170 according to the record configuration 164 of the trigger 160, at 625 and 630. The diagnostic data monitor 150 further captures the data as specified by the record configuration 164. It should be noted that the record configuration 164 can specify capturing other input signals (or computations thereof) that are different from the input signals used in the trigger condition 162. If a one-time data capture is requested in the record configuration, the diagnostic data monitor handles another trigger configuration, if any, at 635 and 640. Else, if a repeated data capture is requested for the present trigger 160, the diagnostic data monitor 150 continues to monitor and/or capture data as requested, at 635. It should be noted that although a continuous data capture is requested, the diagnostic data monitor 160 handles another trigger 160, for example, using multi-programming.

The method further includes sending the stored data from the records 170 to another processing unit 152, at 650. For example, the data can be sent to a diagnostic tool that analyzes the recorded data and generates diagnostic trouble codes, diagnostic report, and/or other types notifications for the operator. In one or more examples, the notifications can be provided to the operator during runtime of the vehicle 100.

According to one or more embodiments, technical solutions described herein facilitate configuration of diagnostic data capture without a technical understanding of the design implementation by an operator. Further, according to one or more embodiments, technical solutions described herein facilitate retrieval of the saved data without a technical understanding of the design implementation.

The technical solutions described herein facilitate a customizable diagnostic data monitor used to capture diagnostic data when a defined condition is met, where the condition can be customized and further the capturing of the data can be customized. As noted herein, the technical solutions described herein can be used with any type of steering systems, such as an EPS system, a SbW system, and the like. The described technical solutions improve the operation of such steering systems by providing a practical application in a particular technical field.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

The invention claimed is:

1. A steering system comprising:
   a motor;
   a controller; and
   a monitoring system that comprises at least a memory device and a processor, the monitoring system coupled with the controller, the monitoring system configured to capture, in real time, diagnostic data of the steering system, wherein the monitoring system is configured to determine the diagnostic data that is to be captured by:
      receiving a trigger configuration that is set-up by an operator, the trigger configuration corresponds to at least one trigger that comprises a trigger condition and a record configuration, the trigger condition comprising at least one of an input value, logical operator and comparison value, the record configuration comprising a data parameter related to trigger event data capture, at least one of the trigger condition and the record configuration being configured by the operator;
      identifying a computation based on a control signal of the steering system by parsing the trigger condition;
      computing a first value based on the computation that is identified;
      comparing the first value with a second value identified from the trigger condition using a logical operator specified in the trigger condition; and
      in response to the first value and the second value satisfying the trigger condition according to the logical operator that is specified, capturing the diagnostic data in a record that is formatted according to the record configuration.

2. The steering system of claim 1, wherein the record configuration indicates a duration for which to capture the diagnostic data.

3. The steering system of claim 1, wherein the record configuration indicates data capture rate at which to capture the diagnostic data.

4. The steering system of claim 1, wherein the record configuration indicates a persistence duration for which to persist the record, the persistence duration being one from a group of: each ignition cycle, since first ignition cycle, and overwrite most recent.

5. The steering system of claim 1, wherein the diagnostic data that is captured includes one or more control signal values of the steering system.

6. The steering system of claim 1, wherein the record is a first record captured at a first timestamp, and the monitoring system is further configured to adjust the trigger condition dynamically and in response capture a second record captured at a second timestamp, the first record being distinct from the second record.

7. The steering system of claim 1, wherein the monitoring system is further configured to:
   determine a validity of the trigger configuration during a setup of the trigger configuration by an operator; and
   indicate the validity of the trigger configuration for the operator to adjust the trigger configuration accordingly.

8. The steering system of claim 7, wherein the validity of the trigger configuration is based on an amount of memory space available and a potential amount of memory space required to store the record corresponding to the trigger condition.

9. The steering system of claim 1, wherein the trigger configuration has a plurality of triggers, and the monitoring system is configured to prioritize at least one of the triggers relative to the other triggers in accordance with a priority specified by the operator.

10. A method to capture, in real time, diagnostic data of a steering system, the method comprising:
   setting up a trigger configuration by an operator, the trigger configuration corresponding to at least one trigger that comprises a trigger condition and a record configuration, the trigger condition comprising at least one of an input value, logical operator and comparison value, the record configuration comprising a data parameter related to trigger event data capture, at least one of the trigger condition and the record configuration being configured by the operator; and
   determining the diagnostic data that is to be captured, wherein the determination comprises:
      receiving the trigger configuration set-up by the operator;
      identifying a computation based on a control signal of the steering system by parsing the trigger condition;
      computing a first value based on the computation that is identified; and
      comparing the first value with a second value identified from the trigger condition using a logical operator specified in the trigger condition; and
   in response to the first value and the second value satisfying the trigger condition according to the logical operator that is specified, capturing the diagnostic data in a record that is formatted according to the record configuration.

11. The method of claim 10, wherein the record configuration indicates a duration for which to capture the diagnostic data.

12. The method of claim 10, wherein the record configuration indicates data capture rate at which to capture the diagnostic data.

13. The method of claim 10, wherein the diagnostic data that is captured includes one or more control signal values of the steering system.

14. The method of claim 10, wherein the record is a first record captured at a first timestamp, and the monitoring system is further configured to adjust the trigger condition dynamically and in response capture a second record captured at a second timestamp, the first record being distinct from the second record.

15. The method of claim 10, further comprising:
determining a validity of the trigger configuration during a setup of the trigger configuration by an operator; and
indicating the validity of the trigger configuration for the operator to adjust the trigger configuration accordingly.

16. The method of claim 15, wherein the determining the validity of the trigger configuration comprises basing the validity of the trigger configuration on an amount of memory space available and a potential amount of memory space required to store the record corresponding to the trigger condition.

17. The method of claim 10, wherein the trigger configuration has a plurality of triggers, and further comprising prioritizing at least one of the triggers relative to the other triggers in accordance with a priority specified by the operator.

18. A computer program product comprising a memory storage device having computer executable instructions stored therein, the computer executable instructions when executed by a processing unit cause the processing unit to perform a method to capture, in real time, diagnostic data of a system, the method comprising:
setting up a trigger configuration by an operator, the trigger configuration corresponding to at least one trigger that comprises a trigger condition and a record configuration, the trigger condition comprising at least one of an input value, logical operator and comparison value, the record configuration comprising a data parameter related to trigger event data capture, at least one of the trigger condition and the record configuration being configured by the operator; and
determining the diagnostic data that is to be captured, wherein the determination comprises:
receiving the trigger configuration set-up by the operator;
identifying a computation based on a control signal of the system by parsing the trigger condition;
computing a first value based on the computation that is identified; and
comparing the first value with a second value identified from the trigger condition using a logical operator specified in the trigger condition; and
in response to the first value and the second value satisfying the trigger condition according to the logical operator that is specified, capturing the diagnostic data in a record that is formatted according to the record configuration.

19. The computer program product of claim 18, wherein the record configuration indicates a duration for which to capture the diagnostic data.

20. The computer program product of claim 18, wherein the record configuration indicates data capture rate at which to capture the diagnostic data.

21. The computer program product of claim 18, wherein the diagnostic data that is captured includes one or more control signal values of the system.

22. The computer program product of claim 18, wherein the record is a first record captured at a first timestamp, and the monitoring system is further configured to adjust the trigger condition dynamically and in response capture a second record captured at a second timestamp, the first record being distinct from the second record.

23. The computer program product of claim 18, wherein the method further comprises:
determining a validity of the trigger configuration during a setup of the trigger configuration by an operator; and
indicating the validity of the trigger configuration for the operator to adjust the trigger configuration accordingly.

24. The computer program product of claim 23, wherein the determining the validity of the trigger configuration comprises basing the validity of the trigger configuration on an amount of memory space available and a potential amount of memory space required to store the record corresponding to the trigger condition.

25. The computer program product of claim 18, wherein the trigger configuration has a plurality of triggers, and further comprising prioritizing at least one of the triggers relative to the other triggers in accordance with a priority specified by the operator.

* * * * *